(12) United States Patent
Xue et al.

(10) Patent No.: US 9,171,191 B2
(45) Date of Patent: Oct. 27, 2015

(54) METHOD FOR DYNAMIC AUTHENTICATION BETWEEN READER AND TAG, AND DEVICE THEREFOR

(75) Inventors: Tao Xue, Shenzhen (CN); Junzhao Du, Shenzhen (CN); Hui Liu, Shenzhen (CN); Shujun Liu, Shenzhen (CN); Wen He, Shenzhen (CN); Wenjing Chen, Shenzhen (CN); Jiangkun Guo, Shenzhen (CN); Qingzhe Deng, Shenzhen (CN); Chuanyi Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 13/985,558
(22) PCT Filed: Sep. 1, 2011
(86) PCT No.: PCT/CN2011/079240
§ 371 (c)(1),
(2), (4) Date: Aug. 14, 2013
(87) PCT Pub. No.: WO2012/119434
PCT Pub. Date: Sep. 13, 2012

(65) Prior Publication Data
US 2013/0335198 A1    Dec. 19, 2013

(30) Foreign Application Priority Data
Mar. 7, 2011    (CN) .......................... 2011 1 0054430

(51) Int. Cl.
*G06K 7/10* (2006.01)
*G06F 21/31* (2013.01)
*H04L 9/32* (2006.01)

(52) U.S. Cl.
CPC ............ *G06K 7/10366* (2013.01); *G06F 21/31* (2013.01); *H04L 9/3239* (2013.01); *H04L 9/3273* (2013.01); *H04L 2209/38* (2013.01); *H04L 2209/805* (2013.01)

(58) Field of Classification Search
CPC ..... H04L 9/30; H04L 9/3242; H04L 63/0442; H04L 9/0861; H04L 9/0866; H04L 9/3263; H04L 9/3236; H04W 12/06; H04W 4/008; H04W 12/02; H04W 12/00; G06K 19/07309; G06K 19/073

USPC .......... 340/5.6, 5.86, 10.1, 10.3, 10.4, 10.42, 340/572.1–572.9; 713/168–170; 380/281–286; 705/67
See application file for complete search history.

(56) References Cited

U.S. PATENT DOCUMENTS 7,661,132 B2 * 2/2010 Ohkubo ................ G06F 21/606
                                              713/179

(Continued)

FOREIGN PATENT DOCUMENTS

CN    101217361 A    7/2008
CN    101217362 A    7/2008

(Continued)

OTHER PUBLICATIONS

International Search Report in international application No. PCT/CN2011/079240 mailed on Dec. 1, 2011. (3 pages).

(Continued)

*Primary Examiner* — Brian Zimmerman
*Assistant Examiner* — An T Nguyen
(74) *Attorney, Agent, or Firm* — Oppedahl Patent Law Firm LLC

(57) ABSTRACT

The present disclosure discloses a method for dynamic authentication between a reader and a tag, and an implementing device therefor, to solve the technical problem of necessity of dependence of a traditional authentication method on a real-time, online, reliable and secure connection with a background database, as well as lack of ways for highly autonomous authentication of a tag by a reader. In the present disclosure, only a legitimate reader can obtain corresponding tag authentication information from an authentication database and authenticate or update a corresponding tag status; only a legitimate tag can be processed by the legitimate reader; during the authentication, a dynamic updating mechanism is used for a tag ID which ensures forward security; the reader stores tag information using a hash table and thus increases an authentication speed; data synchronization is achieved cleverly by ways of a counting value. The use of a random number guarantees that a different data packet is used for every authentication, thus hiding tag position information effectively and offering excellent security.

10 Claims, 3 Drawing Sheets

(56) References Cited

U.S. PATENT DOCUMENTS

| | | | |
|---|---|---|---|
| 7,791,451 B2* | 9/2010 | Lei | H04L 63/0492 340/10.1 |
| 8,344,853 B1* | 1/2013 | Warner | G06K 19/07309 340/10.1 |
| 8,933,786 B2* | 1/2015 | Yoon | G06K 19/07309 340/10.1 |
| 9,054,881 B2* | 6/2015 | Lee | H04L 9/3273 1/1 |
| 2003/0172268 A1* | 9/2003 | Walmsley | H04L 9/3271 713/168 |
| 2005/0058292 A1* | 3/2005 | Diorio | G06K 7/0008 380/270 |
| 2007/0133807 A1* | 6/2007 | Lee | H04L 9/0891 380/282 |
| 2010/0161999 A1* | 6/2010 | Poovendran | H04L 9/3236 713/189 |
| 2013/0207780 A1* | 8/2013 | Poovendran | H04L 9/3236 340/10.1 |
| 2013/0335198 A1* | 12/2013 | Xue | G06F 21/31 340/10.1 |

FOREIGN PATENT DOCUMENTS

| | | |
|---|---|---|
| CN | 101256615 A | 9/2008 |
| CN | 101847199 A | 9/2010 |
| CN | 102136079 A | 7/2011 |

OTHER PUBLICATIONS

English Translation of the Written Opinion of the International Search Authority in international application No. PCT/CN2011/079240, mailed on Dec. 1, 2011. (6 pages).

Supplementary European Search Report in European application No. 11860464.4, mailed on Nov. 12, 2014. (8 pages—see entire document).

Zhi-Wei Jiang et al: "A Revised One-Way Hash Based Low-Cost Authentication Protocol in RFID System", Wireless Communications, Networking and Mobile Computing, 2009. WICOM '09. 5th International Conference on, IEEE, Piscataway, NJ, USA, Sep. 24, 2009. (4 pages—see Supplementary European Search Report in European application No. 11860464.4 for relevant pages).

Jihwan Lim et al: "A New Hash-Based RFID Mutual Authentication Protocol Providing Enhanced User Privacy Protection", May 7, 2007, Information Security Practice and Experience; [Lecture Notes in Computer Science], Springer Berlin Heidelberg, Berlin, Heidelberg. (12 pages—see Supplementary European Search Report in European application No. 11860464.4 for relevant pages).

* cited by examiner

METHOD FOR DYNAMIC AUTHENTICATION BETWEEN READER AND TAG, AND DEVICE THEREFOR

TECHNICAL FIELD

The present disclosure relates to radio frequency identification (RFID) technology, and in particular to a method for dynamic ID authentication between a tag and a high-autonomy-based RFID reader, and a device therefor.

BACKGROUND

Radio Frequency Identification (RFID) is a non-contact automatic identification technology which identifies a target object and obtains relevant data via a radio-frequency signal. The technology dispenses with manual intervention, is able to work under a complex environment and has the remarkable advantage that it does not require any physical contact. At present, RFID products are widely applied in fields such as retail, automatic charging, animal identification, logistics, storage, library management and the like.

The basic composition of RFID is a reader, an RFID tag and a background database (DB). Under a general circumstance, an electronic tag consists of an antenna and a tag dedicated chip. Each tag has a unique electronic code attached to the target object. The reader is a device for performing read-write operations on the tag, and mainly includes the two parts of a radio frequency module and a digital signal processing unit. The basic function of the reader is to provide a means of data transmission with the tag. The background database is mainly used for information storage, and is a database management system including data and authentication information of all tags in the system.

A tag device of the RFID system has some limitations such as limited storage space and limited calculating ability and so on. So design of an efficient, secure, and low-cost RFID security authentication method has become a new challenging problem. Current methods used to implement an RFID security mechanism mainly include a physical mechanism and a password mechanism. The physical mechanism requires addition of many physical elements and devices, which increases the cost of the tag and is not applicable to a low-cost-tag RFID system. Therefore what presented more frequently in recent RFID security research is a security mechanism based on password technology, and a design of RFID security authentication based on a Hash function is in particular under the spotlight. Current RFID security authentication based on password technology can be roughly divided into two categories: a static-ID-based mechanism and a dynamic-ID-based mechanism. The so-called "static-ID-based mechanism" method refers to that a tag ID will not be updated during authentication and remains unchanged, which method is usually used in occasions with low security demands, and cannot meet a requirement of forward security; Meanwhile, the "dynamic-ID-based mechanism" method refers to that the identification information of the tag may be updated in an authentication session, such that even if the current state of the tag is broken through, it is still impossible to conjecture a state of any previous time point or associate it with a previously obtained state. It is usually used for storing a writable tag and in occasions with high security demands, and can meet the requirement of forward security.

In a traditional authentication method, the basic model of the authentication method is as shown in FIG. 1. First the reader initiates an authentication request to the tag. The tag returns a response packet to the reader after receiving the request. After receiving the packet, the reader does not perform any operation but directly forwards the response packet to the background database, which authenticates the reader and the tag according to the response packet. If the authentication succeeds, the background database transfers the relevant information of the tag to the reader, which processes it corresponding.

A major disadvantage of the traditional method is that it presumes a strong reliability assumption. It requires a constant connection between the reader and the background database and it deems that the connection between the reader and the background database is safe. That is to say, if the reader cannot connect with the background database, neither the authentication nor corresponding operation processing can be performed. In real life, however, a truly secure channel between the reader and the background database cannot be achieved. And with the widespread application of the RFID technology to mobile devices, the real-time connection between the reader and the background database cannot be guaranteed. Moreover, the cost of keeping real-time linking will be very high, which impedes the widespread application of this technology.

SUMMARY

In view of the above, the main objective of the disclosure is to provide a method for dynamic authentication between a reader and a tag, and an implementing device therefor to solve the technical problem of necessity of dependence of a traditional authentication method on a real-time, online, reliable and secure connection with a background database, as well as lack of means for highly autonomous authentication of a tag by a reader.

To achieve this objective, the technical solution of the present disclosure is implemented as follows:

The present disclosure provides a method for dynamic authentication between a reader and a tag, including:

generating ($id_j$, $metaID_{cj}$, $index_j$, $c_j$) in an authentication database, issuing ($metaID_{crj}$, $h(r_i, index_j)$, $c_{rj}$) for an authorized reader, and downloading ($metaID_{ctj}$, $index_j$, $c_{tj}$) for a tag, wherein $id_j$ is a unique identification of the tag $T_j$; $metaID_{cj}$, $metaID_{crj}$ and $metaID_{ctj}$ are values obtained after $c_j$, $c_{rj}$, and $c_{tj}$ Hash operations on the $id_j$, respectively; $index_j$ is an index value corresponding to the tag; $r_i$ is a unique identification of the reader $R_i$; $h(r_i, index_j)$ is a positional value generated by the authentication database for finding tag information in a hash table $L_i$ of the reader; and h is a hash function;

generating, by the reader $R_i$, a random number $n_r$, and then sending, by the reader $R_i$, a request carrying the $r_i$ and the $n_r$ to the tag $T_j$;

generating, by the tag $T_j$, a random number $n_t$, calculating, by the tag $T_j$, $HRI=h(r_i, index_j)$, $IN=h(r_i, n_r, n_t) \oplus HRI$, and $ME=h(metaID_{ctj}, n_r, n_t)$, and then feeding, by the tag $T_j$, the IN, ME, $c_{tj}$ and $n_t$ to the reader $R_i$;

calculating, by the reader $R_i$, the value of $h(r_i, n_r, n_t)$, obtaining, by the reader $R_i$, the value of HRI through an Exclusive OR operation on the calculated value of $h(r_i, n_r, n_t)$ and the IN, and then finding, by the reader $R_i$, whether there is tag information equal to the value of HRI in the hash table; if there is and $c_{tj}-c_{rj} \geq 0$ holds, calculating, by the reader $R_i$, $metaID=h^{c_{tj}-c_{rj}}(metaID_{crj})$, otherwise determining, by the reader $R_i$, that authentication of the tag fails; and calculating, by the reader $R_i$, the value of $h(metaID, n_r, n_t)$, and then determining, by the reader $R_i$, whether the calculated value and ME are equal; if they are equal, determining, by the reader $R_i$, that tag authentication by the reader is successful.

Furthermore, the method may further include the following steps for authenticating the reader $R_i$ by the tag $T_j$:

calculating, by the reader $R_i$, the value of $M=h(h(metaID), n_r, n_t)$, and then sending, by the reader $R_i$, the value of M to the tag;

after receiving M, calculating, by the tag $T_j$, $h(h(metaID_{ctj}), n_r, n_t)$, and then determining, by the tag $T_j$, whether the calculated value and M are equal; if they are equal, determining, by the tag $T_j$, that authentication of the reader by the tag is successful, otherwise determining, by the tag $T_j$, that the authentication of the reader fails.

Furthermore, the method may further include steps for updating:

after the reader $R_i$, successfully authenticates the tag $T_j$, performing, by the reader $R_i$, an assignment operation: $metaID_{ctj}=metaID$, $c_{rj}=c_{tj}$;

after the tag $T_j$ successfully authenticates the reader $R_i$, performing, by the tag $T_j$, an operation: $metaID_{ctj}=h(metaID_{ctj})$, $c_{tj}=c_{tj}+1$.

Furthermore, after obtaining, by the reader $R_i$, the value of HRI, the finding, by the reader $R_i$, whether there is tag information equal to the value of HRI in the hash table may be:

obtaining, by the reader $R_i$, the address of a corresponding tag in the hash table by finding a remainder by calculating $h(r_i, index_j)$ % maxL, and then finding, by the reader $R_i$, a node with a node value equal to $h(r_i, index_j)$ in a linear linked list corresponding to the address, wherein if the node is found, it means that there is tag information equal to the value of HRI, otherwise it means that there is no tag information equal to the value of HRI.

Based on an embodiment of the present disclosure, the present disclosure further provides a tag searching method, including:

broadcasting, by the reader $R_i$, IN, $r_i$ and $n_r$ to multiple tags, $IN=[h(h(r_i, index_j), n_r)]_m$, wherein $r_i$ is a unique identification of the reader, $n_r$ is a random number generated by the reader, $index_j$ is a unique index of a tag $T_j$ to be found, and $[\ ]_m$ means taking the first m digits of a resulting hash value;

after the tags receive the broadcast, calculating, by each tag, $[h(h(r_i, ownindex), n_r)]_m$ and comparing, by each tag, the calculated value with the IN; if they are not equal, making no response, otherwise generating, by the tag, a pseudo random number $n_t$, calculating, by the tag, $TM=h(metaID_{ctj}, n_r, n_t)$ and $TC=h(r_i, n_r, n_t) \oplus c_{tj}$, and then feeding, by the tag, TM, TC and $n_t$ back to the reader; and obtaining, by the reader $R_i$, $c_{tj}$ via a reverse Exclusive OR operation, calculating, by the reader $R_i$, $metaID=h^{c_{tj}-c_{rj}}(metaID_{crj})$ and $h(metaID, n_r, n_t)$, and then comparing, by the reader $R_i$, the calculated $h(metaID, n_r, n_t)$ with the received TM, wherein if they are equal, it means that the finding the tag $T_j$ by the reader $R_i$ succeeds, otherwise it means that the finding fails.

Furthermore, the tag searching method may further include:

performing, by the reader $R_i$, an assignment operation: $metaID_{ctj}=metaID$, $c_{rj}=c_{tj}$ when the finding succeeds; and sending, by the reader $R_i$, successfully found information to the tag $T_j$, and after the tag $T_j$ successfully authenticates the reader $R_i$, performing, by the tag $T_j$, an operation: $metaID_{ctj}=h(metaID_{ctj})$, $c_{tj}=c_{tj}+1$.

Based on an embodiment of the present disclosure, the present disclosure further provides a Radio Frequency Identification (RFID) reader, including:

a tag information acquisition module configured to be used for authentication of legitimacy of a reader $R_i$ by an authentication database and request to download information $(metaID_{crj}, h(r_i, index_j), c_{rj})$ of a tag $T_j$ from the authentication database;

a random number generating module configured to generate a random number $n_r$;

an authentication request module configured to send a request carrying $r_i$ and $n_r$ to the tag $T_j$ and receive a response message carrying values of IN, ME, $c_{tj}$ and $n_t$ sent by the tag;

a position finding module configured to calculate the value of $h(r_i, n_r, n_t)$, obtain the value of HRI through an Exclusive OR operation on the calculated value of $h(r_i, n_r, n_t)$ and the IN, and then find whether there is tag information equal to the value of HRI and satisfying $c_{tj}-c_{rj} \geq 0$ in a hash table, and if there is not, inform an authentication response module that the authentication fails, otherwise inform a tag identification authentication module that the finding succeeds;

the tag identification authentication module configured to calculate, when the finding by the position finding module succeeds, the value of $h(metaID, n_r, n_t)$, determine whether the calculated value and ME are equal, and if they are equal, inform the authentication response module that the authentication succeeds, otherwise inform the authentication response module that the authentication fails;

the authentication response module configured to send authentication failure information to the tag, or send authentication success information carrying the value of $M=h(h(metaID), n_r, n_t)$; and a storage module configured to store the hash table, the random number and reader identification information, wherein the tag information $(metaID_{crj}, h(r_i, index_j), c_{rj})$ issued by the authentication database is stored in the hash table.

The RFID reader may further include:

an updating module configured to perform an assignment operation $metaID_{ctj}=metaID$, $c_{rj}=c_{tj}$ after the reader $R_i$ successfully authenticates the tag $T_j$.

Based on an embodiment of the present disclosure, the present disclosure further provides a tag, including:

a storage module configured to store tag information $(metaID_{ctj}, index_j, c_{tj})$ downloaded from an authentication database;

a random number generating module configured to generate a random number $n_t$;

an authentication response module configured to receive a request carrying $r_i$ and $n_r$ sent by a reader $R_i$, calculate $HRI=h(r_i, index_j)$, $IN=h(r_i, n_r, n_t) \oplus HRI$, and $ME=h(metaID_{ctj}, n_r, n_t)$, and then feed a response message carrying values of IN, ME, $c_{tj}$ and $n_t$ back to the reader $R_i$; and a reader authentication module configured to calculate, when receiving a request message carrying an M value sent by the reader $R_i$, $h(h(metaID_{ctj}), n_r, n_t)$, determine whether the calculated $h(h(metaID_{ctj}), n_r, n_t)$ and M are equal, and determine that authentication of the reader by the tag is successful if they are equal, otherwise determine that the authentication of the reader fails.

The tag may further include:

an updating module configured to perform an operation $metaID_{ctj}=h(metaID_{ctj})$, $c_{tj}=c_{tj}+1$ after the tag $T_j$ successfully authenticates the reader $R_i$.

Compared with the existing traditional tag authentication methods, the technical solution of the disclosure has the following beneficial effects:

(1) The reader does not need a real-time connection with the background database, and the authentication of the tag is not completed at the database side. The authentication database according to the present disclosure is only in charge of maintaining and providing authentication information. After the authentication information is downloaded to the legitimate reader and tag, the reader and the tag authenticate each other independently, no longer relying on the online authentication of the tag by the background database, which facilitates usage by a user.

(2) Analyzing from the security point of view, the present disclosure adopts an authorized access mechanism, only a legitimate reader can obtain the initial ID value of the corresponding tag from an authentication database, and only the legitimate reader can authenticate or update a corresponding tag status; the present disclosure also adopts a bidirectional authentication mechanism, where only a legitimate tag can be processed by the legitimate reader; the present disclosure adopts a unidirectional hash function, and provides a dynamic updating mechanism of an ID, which ensures forward security; the reader stores tag information using a hash table and thus increases an authentication speed; data synchronization is achieved cleverly by means of a counting value; the use of a random number guarantees that a different data packet is used for every authentication, which may well prevent eavesdropping attack, sham attack and so on, as well as hide tag position information effectively. Analysis shows that the authentication method provided by the present disclosure offers excellent security.

DETAILED DESCRIPTION

To make the objective, technical solution, and advantage of the present disclosure more clear, the present disclosure is further elaborated below with reference to the figures and embodiments.

The h(.) in an embodiment of the present disclosure is a digest function $\{0,1\}^* \rightarrow \{0,1\}^l$ in a cryptography sense, wherein l is a safety parameter of the RFID system and here is the ID length of the tag of the present disclosure. Assume that there are m readers $R_i$, $1 \leq i \leq m$, and n tags $T_j$, $1 \leq j \leq n$, in the system, wherein m and n are positive integers greater than or equal to 1.

Figure 3:
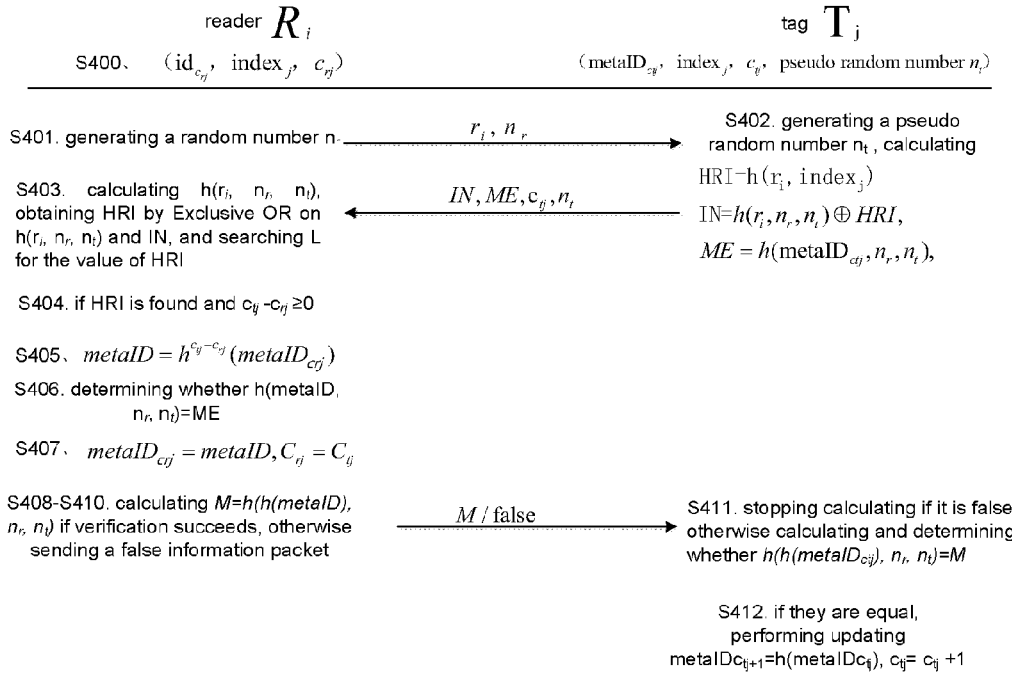
FIG. 3 is the flowchart of a method for dynamic ID authentication based on a highly autonomous RFID reader provided by an embodiment of the present disclosure.

FIG. 3 is the flowchart of steps of a method for dynamic ID authentication based on a highly autonomous RFID reader provided by an embodiment of the present disclosure, with detailed steps as follows:

Step S400: the initialization of an authentication database, a reader $R_i$ and a tag $T_j$ is performed, ($id_j$, $metaID_{cj}$, $index_j$, $c_j=1$) is generated in the authentication database, ($metaID_{crj}=id_j$, $h(r_i, index_j)$, $c_{rj}=0$) is issued for an authorized reader, and ($metaID_{ctj}$, $index_j$, $c_{tj}=1$, $n_t$) is downloaded for the tag;

When the tag $T_j$ is added to the system and put to use, the authentication database initially generates and stores information ($id_j$, $metaID_{cj}$, $index_j$, $c_j$) of the tag $T_j$. Wherein, $id_j$ is a unique identification of the tag $T_j$; $metaID_{cj}$ is the value obtained after $c_j$ Hash operations on $id_j$, where in an embodiment of the present disclosure, the initial value of $c_j$ is set to be 1, i.e. the initial $metaID_{cj}=h(id_j)$; $index_j$ is an index value corresponding to the tag for quick search of a storage module of the reader for information corresponding to the tag. This value is a private value which is only stored in the authentication database and the tag and is hidden from the reader;

Initially, ($metaID_{ctj}$, $index_j$, $c_{tj}$, $n_t$) is stored in the tag $T_j$, wherein $metaID_{ctj}$ is the value obtained after $c_j$ Hash operations on $id_j$. The value of $metaID_{ctj}$ in the tag is updated via the hash function using a hash-chain like method in a later authentication process. Initially, in the embodiment of the present disclosure, $c_{tj}=1$. $n_t$ is a random number, is issued in this embodiment by the authentication database, and is for generating a pseudo random number by the tag during the authentication. In order to provide better security, a random number generating module may also be provided in the tag which independently generates the random number $n_t$.

Initially, a unique identification value $r_i$ is assigned to each reader $R_i$. When a legitimate reader $R_i$ applies to the authentication database for permission to access the tag $T_j$, the authentication database authorizes $R_i$ and stores the information ($metaID_{crj}$, $h(r_i, index_j)$, $c_{rj}$) in a hash table in the reader for storing tag information. What is to be noted in particular is that $h(r_i, index_j)$ is a value calculated by the authentication database at the time of authorization instead of a formula, which value may be understood as identification information on a position where the tag information is stored in the reader. $c_{rj}$ is initialized with 0. $metaID_{crj}$ represents the value obtained after $c_j$ hash operations on $id_j$ of the tag. When $c_{rj}$ is initialized with 0, $metaID_{crj}=id_j$ correspondingly.

In the embodiment of the present disclosure, $c_{rj}$ of any reader is always less than or equal to $c_{tj}$ of the tag at the initialization and during a later dynamic authentication, otherwise the reader deems the tag illegal.

Figure 1:
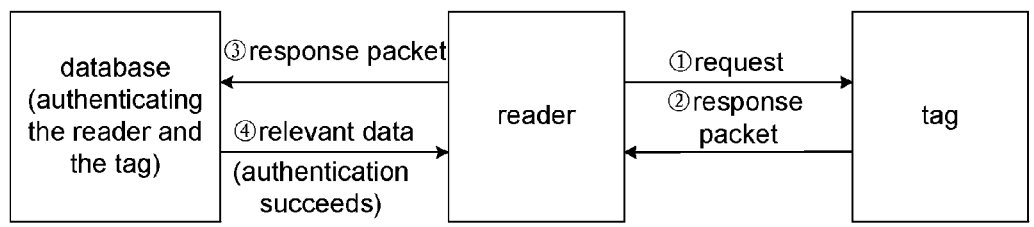
FIG. 1 is the flowchart of a traditional RFID authentication method.
Figure 2:
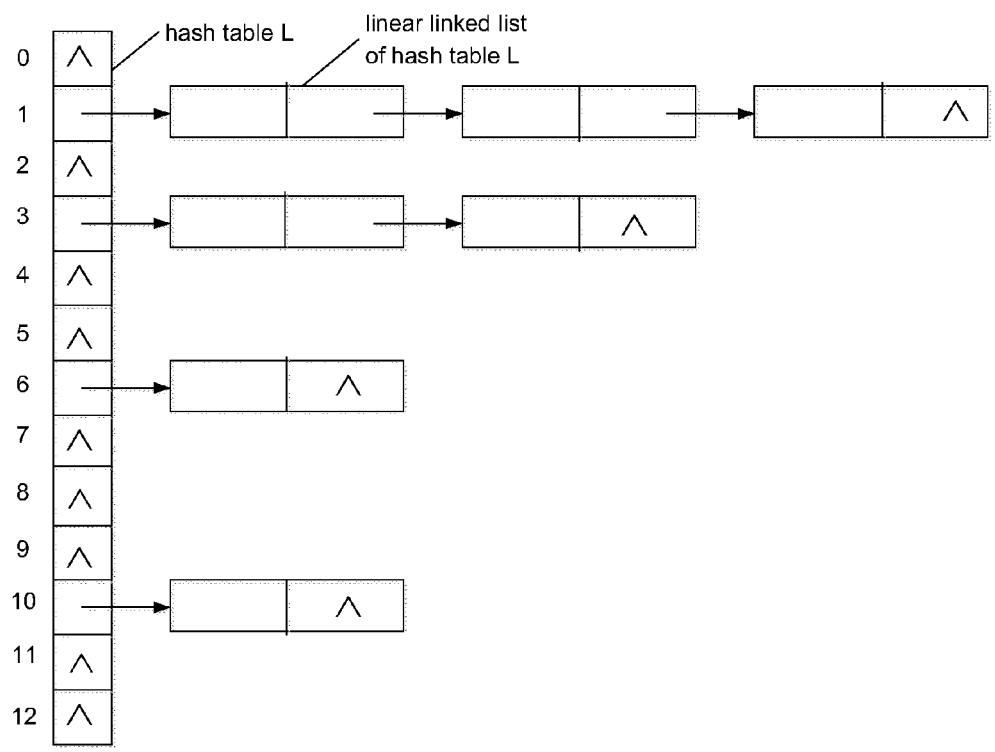
FIG. 2 is the schematic diagram of a storage structure of a hash table in a reader of an embodiment of the present disclosure.

The disclosure takes $h(r_i, index_j)$ as the identification for the storage position the tag information so as to associate the unique identification $r_i$ of the reader with the unique identification $index_j$ of the tag via the hash operation, such that $index_j$ is hidden, and the information on the same tag may be stored in different readers with different addresses;

In a preferred embodiment of the present disclosure, a data structure as shown in FIG. 2 is established to store the tag information. The positional value of the tag information in the hash table is determined by finding the remainder from dividing $h(r_i, index_j)$ by a maximum storage space number maxL of the hash table $L_i$. All tag information with the same $h(r_i, index_j)$ % maxL value is stored with a linear linked list.

In an embodiment of the present disclosure, the reader includes a pseudo random number generator for generating $n_r$, and further includes a same Hash function module as the Hash function module in the tag configured to perform equivalent hash operations. In order to provide better security, the reader can further set an independent random number generating module for generating $n_r$.

Step S401: the reader $R_i$ generates random number $n_r$, and then sends the tag $T_j$ a request carrying identification value $r_i$ of the reader $R_i$ and the random number $n_r$ generated by the reader;

Step S402: after the tag receives the authentication request, the tag $T_j$ first utilizes the hash function to calculate a new pseudo random number $n_t=h(n_t)$ and saves the new value, and then utilizes $r_i$ sent by the reader and locally saved $index_j$ to calculate:

$$HRI=h(r_i, index_j),$$

$$IN=h(r_i, n_r, n_t) \oplus HRI$$

$$ME=h(metaID_{ctj}, n_r, n_t),$$

After the above calculated results are obtained, the tag feeds (IN, ME, $c_{tj}$, $n_t$) back to the reader;

In the above steps, the authentication request sent by the reader to the tag includes a random number $n_r$. After receiving an authentication request, the tag generates a pseudo random number $n_t$ by calling the hash function according to the random number issued by the authentication database. The two random numbers guarantee that data transferred every time between the reader and the tag are different. In order to reduce the cost of the tag, there is no random number generating module in an actual tag, the random number generated by the tag is a pseudo random number. A random number generating module may certainly be provided for the tag for generating the random number independently to provide better security. In the embodiment of the present disclosure, a random number is written in the tag in advance, and a later random number is the pseudo random number generated by calculating according to the hash function.

Step S403: when receiving a response of the tag, the reader first analyzes the data packet to obtain IN, ME, $c_{tj}$ and $n_t$, respectively, and then utilizes $r_i$ and $n_r$ in the local terminal and the received $n_t$ to calculate $h(r_i, n_r, n_t)$, and obtains the value of $h(r_i, index_j)$ calculated by the tag, i.e. HIR in step S402 through an Exclusive OR operation on the calculated $h(r_i, n_r, n_t)$ and the IN, then obtains the remainder from $h(r_i, index_j)$ % maxL to obtain the address of a corresponding tag in the hash table; compares $h(r_i, index_j)$ with the value of h_index_r of each node in the linear list, wherein h_index_r is the $h(r_i, index_j)$ downloaded from the database by the reader.

Step S404: if a node equal to $h(r_i, index_j)$ is found in the hash table in step S403 and $c_{tj}-c_{rj} \geq 0$, then a tag position is successfully found and then step S405 is performed; otherwise the reader fails to authenticate the tag and the method flow jumps to step S410.

Step S405: the reader derives the current value of metaID of the tag as follows:

$$metaID=h^{c_{tj}-c_{rj}}(metaID_{crj});$$

$metaID_{crj}$ and $c_{rj}$ are known values, and the reader obtains the value of metaID at time zero by $c_{tj}-c_{rj}$ hash operations;

Step S406: the reader calculates h(metaID, $n_r$, $n_t$), and determines whether the resulting value and ME are equal: if they are equal, the reader successfully verifies the tag, and in this case the reader deems the tag legal, and then step S407 is performed; otherwise authentication by the reader fails and step S409 is performed;

Step S407: after the successful authentication in step S406, the data in the reader are updated to the values of $metaID_{ctj}$ and $c_{tj}$ of the tag at the time of current authentication, i.e. an assignment operation $metaID_{crj}=metaID$, $c_{rj}=c_{tj}$ is performed;

Step S408: the reader calculates M according to the following method, and sends M to the tag for authentication of the reader by the tag and then S411 is performed;

$$M=h(h(metaID), n_r, n_t)$$

Step S409: when the reader fails to authenticate the tag in step S406, the reader sends an authentication failure information packet to the tag;

Step S410: if the tag position fails to be found in step S404, then the present disclosure deems that the authentication fails, and in this case the tag may be fake or the tag is not one the reader is authorized to authenticate, and the reader sends the authentication failure information packet to the tag;

Step S411: the tag analyzes the data after receiving the response of the reader. If it is an authentication failing response packet, the tag stops calculating; If it is not the authentication failing response packet, the tag analyzes the obtained data M, and calculates $h(h(metaID_{ctj}), n_r, n_t)$, and then determines whether the calculated result and M are equal: if they are equal, the tag successfully authenticates the reader.

Step S412: after the successful authentication in step S411, the tag updates the data as well, wherein one hash operation is performed on $metaID_{ctj}$, and $c_{tj}$ is increased by 1, i.e. the tag performs $metaID_{ctj}=h(metaID_{ctj})$, $c_{tj}=c_{tj}+1$.

Step S407 and step S412 of the embodiment of the present disclosure are steps in which the reader and the tag perform updating respectively. Information updating refers to respective updating of the reader and the tag with their own information without interaction of respective information therein between each other to ensure the security of the information. The disclosure allows that even when authentication fails in case of a legitimate authentication, and updating is done with part of the information, causing the reader and the tag fail to perform information updating at the same time, the legitimate reader and the tag still can authenticate each other in the next authentication without the need to store the old and new passwords at the same time.

Based on the method for dynamic ID authentication based on a highly autonomous RFID reader provided by the present disclosure, the present disclosure further presents a method for tag searching utilizing the reader provided in the present disclosure. A lot of times, it is required to search a number of tags for a certain tag. It is obviously inefficient and unpractical if only the authentication method of the present disclosure is used to verify each of the tags to find the tag required by the system. Therefore, the present disclosure presents a searching method based on the authentication method.

The objective of the searching is to allow an authorized reader to find a tag that the reader is authorized to access among many tags and to enable the corresponding tag to answer the reader. In an ideal state, only this tag will respond and transfer its own information to the authorized reader. For the reader $R_i$, an intuitive method is for $R_i$ to broadcast to all the tags to request $id_j$. When the own ID of a certain tag $T_j$ satisfies ownid==$id_j$, $T_j$ returns reply information to the reader.

This simple method cannot provide any security assurance and is very susceptible to eavesdropping and masquerading. Such a broadcast method especially cannot resist a tracking attack very well. The attacker first may eavesdrop on the broadcast packet of the reader, and then utilizes this packet to access tags frequently. As only a correct and legitimate tag would make a response, the response packet may reveal the position information of the tag. Therefore, a secure searching method presented based on the authentication method of the present disclosure is as follow:

Step 501: a reader broadcasts IN, $r_i$ and $n_r$ to a tag;

Wherein, IN=$[h(h(r_i, index_j), n_r)]_m$, i.e. IN are the first m digits of a hash value $h(h(r_i, index_j), n_r)$. The reason only the first m digits are sent is for reducing a matching precision; in multiple tags, there may exist multiple tags whose calculated tag results are the same. As a result, there are often multiple tags responding to the broadcast, preventing the tracking attack to a large extent; $r_i$ is a unique identification of the reader $R_i$. $n_r$ is a random number generated by the reader $R_i$.

Step 502: after the tags receive the broadcast of the reader, each of the tags calculates $[h(h(r_i, ownindex), n_r)]_m$ and compares it with the value of IN: if they are equal, step 503 is performed, otherwise no response is made; ownindex is used to identify the own index value of each tag;

Step 503: the tag generates a pseudo random number $n_t$, calculates $TM=h(metaID_{ctj}, n_r, n_t)$ and $TC=h(r_i, n_r, n_t) \oplus c_{tj}$, and then feeds TM, TC and $n_t$ back to the reader;

Step S504: when receiving feedback information sent by the tag, the reader first calculates $h(r_i, n_r, n_t)$, then performs an Exclusive OR operation on $h(r_i, n_r, n_t)$ and TC to obtains $c_{tj}$, calculates the current $metaID=h^{c_{tj}-c_{rj}}(metaID_{crj})$, then calculates $h(metaID, n_r, n_t)$; and compares the calculated value with the received data $h(metaID_{ctj}, n_r, n_t)$; if they are equal, it means that the reader has found the required tag $T_j$, otherwise it means that the search fails. After the search succeeds, the reader will further send successful search information, so that the tag may perform data updating. These steps are the same as the process of the above authentication method (refer to step S410 to step S412). It can be seen that the searching method is based on the above authentication method presented by the present disclosure, and therefore still falls in the scope of the technical solution of the present disclosure.

In addition to the aforementioned steps, the method described in the present disclosure further includes system maintenance steps as follows: the authentication database is in charge of generating, setting up and deploying a tag, generating a unique id value and a digest value index in the system for the tag, generating a unique identification value r in the system for a reader, managing data and authentication information of the reader and the tag in the system, and being able to download the data to a legitimate reader tag.

The present disclosure is used in the circumstance where multiple readers are assumed to all have legitimate operating authorizations for the same tag. For example, in an automatic luggage identification system, the present disclosure desires that a reader authorized by an official of an airport where a luggage is located is able to identify the luggage and confirm the information therein; meanwhile, it is assumed that an RFID reader is included in a passenger's mobile phone, so that the owner of the luggage may search and identify the luggage and confirm the information therein. As multiple readers can identify the luggage, the present disclosure designs a tag ID value as being varying dynamically. The method in the present disclosure can be divided into two parts: the authentication method and the updating method. However, as authentication of one tag will not be overly frequent in the luggage identification system, data updating may be optionally performed every time the authentication succeeds in the luggage system.

Figure 4:
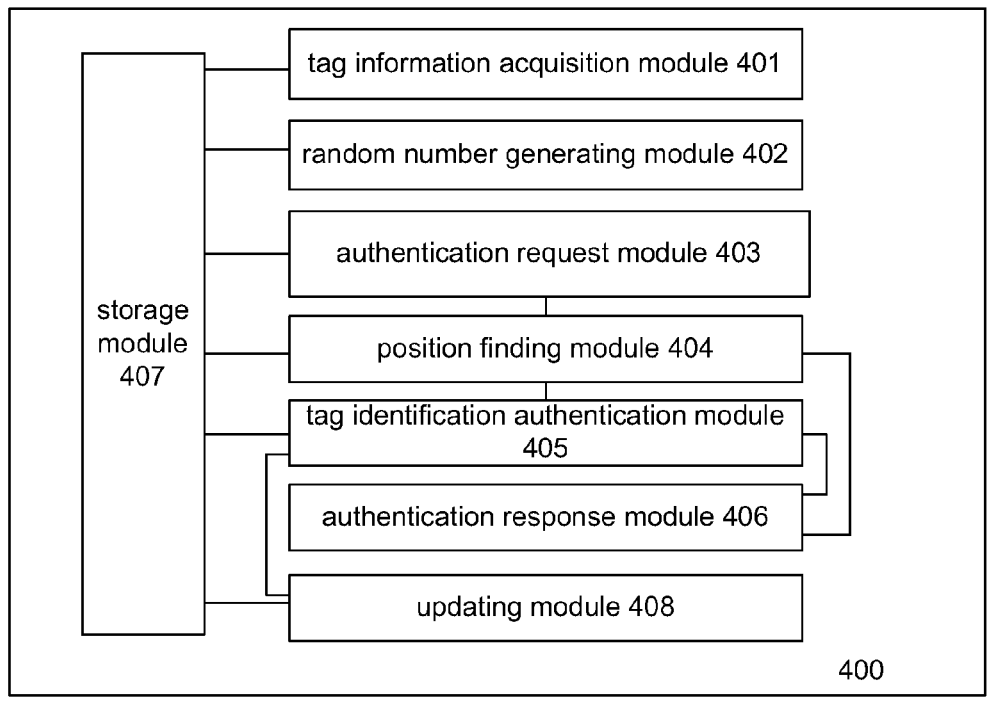
FIG. 4 is the compositional schematic diagram of functional modules of the RFID reader provided by an embodiment of the present disclosure.

FIG. 4 is the compositional and structural schematic diagram of the functional modules of the RFID reader provided by an embodiment of the present disclosure and intended for implementing the authentication method provided by the present disclosure. The reader 400 includes the following functional modules:

A tag information acquisition module 401 configured to be used for authentication of legitimacy of a reader $R_i$ by an authentication database and request to download information $(metaID_{crj}, h(r_i, index_j), c_{rj})$ of a tag $T_j$ from the authentication database;

A random number generating module 402 configured to generate a random number $n_r$;

An authentication request module 403 configured to send a request carrying $r_i$ and $n_r$ to the tag $T_j$ and receive a response message carrying values of IN, ME, $c_{tj}$ and $n_t$ sent by the tag;

A position finding module 404 configured to calculate the value of $h(r_i, n_r, n_t)$, obtain the value of HRI through an Exclusive OR operation on the calculated value of $h(r_i, n_r, n_t)$ and the IN, and then find whether there is tag information equal to the value of HRI and satisfying $c_{tj}-c_{rj} \geq 0$ in a hash table, and if there is not, inform an authentication response module that the authentication fails, otherwise inform a tag identification authentication module that the finding succeeds;

A tag identification authentication module 405 configured to calculate, when the finding by the position finding module succeeds, the value of $h(metaID, n_r, n_t)$, determine whether the calculated value and ME are equal, and if they are equal, inform the authentication response module that the authentication succeeds, otherwise inform the authentication response module that the authentication fails;

An authentication response module 406 configured to send authentication failure information to the tag, or send authentication success information carrying the value of $M=h(h(metaID), n_r, n_t)$;

A storage module 407 configured to store the hash table, the random number and reader identification information, wherein the tag information $(metaID_{crj}, h(r_i, index_j), c_{rj})$ issued by the authentication database is stored in the hash table; and An updating module 408 configured to perform an assignment operation $metaID_{ctj}=metaID$, $c_{rj}=c_{tj}$ after the reader $R_i$ successfully authenticates the tag $T_j$.

Figure 5:
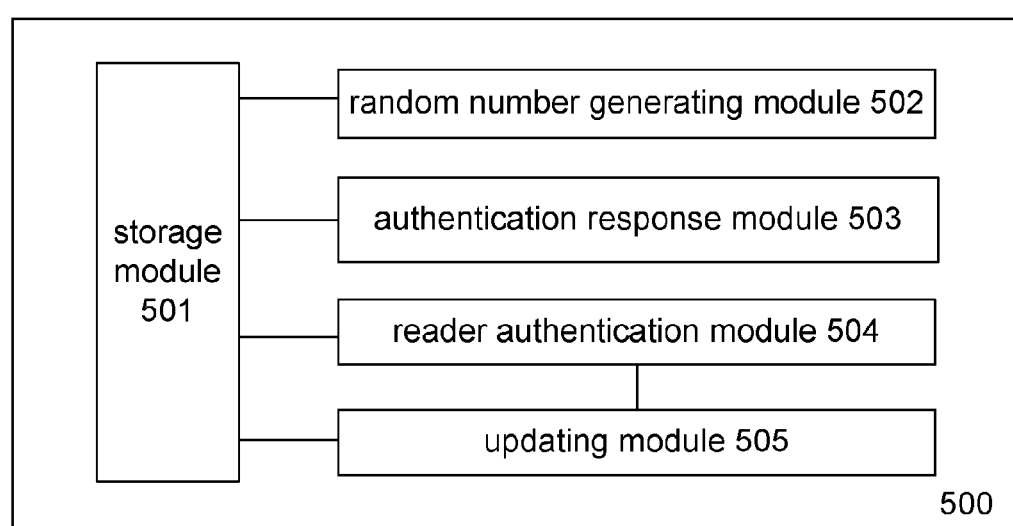
FIG. 5 is the compositional schematic diagram of functional modules of a tag provided by an embodiment of the present disclosure.

FIG. 5 is a tag provided by an embodiment of the present disclosure and intended for implementing the authentication method provided by the present disclosure. The tag 500 includes the following functional modules:

A storage module 501 configured to store tag information $(metaID_{ctj}, index_j, c_{tj})$ downloaded from an authentication database;

A random number generating module 502 configured to generate a random number $n_t$;

An authentication response module 503 configured to receive a request carrying $r_i$ and $n_r$ sent by a reader $R_i$, calculate $HRI=h(r_i, index_j)$, $IN=h(r_i, n_r, n_t) \oplus HRI$, and $ME=h(metaID_{ctj}, n_r, n_t)$, and then feed a response message carrying values of IN, ME, $c_{tj}$ and $n_t$ back to the reader $R_i$;

A reader authentication module 504 configured to calculate, when receiving a request message carrying an M value sent by the reader $R_i$, $h(h(metaID_{ctj}), n_r, n_t)$, determine whether the calculated $h(h(metaID_{ctj}), n_r, n_t)$ and M are equal, and determine that authentication of the reader by the tag is successful if they are equal, otherwise determine that the authentication of the reader fails; and An updating module 505 configured to perform an operation $metaID_{ctj}=h(metaID_{ctj})$, $c_{tj}=c_{tj}+1$ after the tag $T_j$ successfully authenticates the reader $R_i$.

What described are merely preferred embodiments of the present disclosure and are not intended to limit the scope of the present disclosure.

INDUSTRIAL APPLICABILITY

In the technical solution provided by the present disclosure, only a legitimate reader can obtain corresponding tag authentication information from an authentication database and authenticate or update a corresponding tag status; only a legitimate tag can be processed by the legitimate reader; during the authentication, a dynamic updating mechanism is used for a tag ID which ensures forward security; the reader stores tag information using a hash table and thus increases an authentication speed; data synchronization is achieved cleverly by means of a counting value. The use of a random number guarantees that a different data packet is used for every authentication, thus hiding tag position information effectively and offering excellent security.

The invention claimed is:

1. A method for dynamic authentication between a reader and a tag, comprising:
   generating ($id_j$, $metaID_{cj}$, $index_j$, $c_j$) in an authentication database, issuing ($metaID_{crj}$, $h(r_i, index_j)$, $c_{rj}$) for an authorized reader, and downloading ($metaID_{ctj}$, $index_j$, $c_{tj}$) for a tag, wherein $id_j$ is a unique identification of the tag $T_j$; $metaID_{cj}$, $metaID_{crj}$ and $metaID_{ctj}$ are values obtained after $c_j$, $c_{rj}$, and $c_{tj}$ Hash operations on the $id_j$, respectively; $index_j$ is an index value corresponding to the tag; $r_i$ is a unique identification of the reader $R_i$; $h(r_i, index_j)$ is a positional value generated by the authentication database for finding tag information in a hash table $L_i$ of the reader; and h is a hash function;
   generating, by the reader $R_i$, a random number $n_r$, and then sending, by the reader $R_i$, a request carrying the $r_i$, and the $n_r$ to the tag $T_j$;
   generating, by the tag $T_j$, a random number $n_t$, calculating, by the tag $T_j$, $HRI=h(r_i, index_j)$, $IN=h(r_i, n_r, n_t) \oplus HRI$, and $ME=h(metaID_{ctj}, n_r, n_t)$, and then feeding, by the tag $T_j$, the IN, ME, $c_{tj}$ and $n_t$ to the reader $R_i$;
   calculating, by the reader $R_i$, the value of $h(r_i, n_r, n_t)$, obtaining, by the reader $R_i$, the value of HRI through an Exclusive OR operation on the calculated value of $h(r_i, n_r, n_t)$ and the IN, and then finding, by the reader $R_i$, whether there is tag information equal to the value of HRI in the hash table; if there is and $c_{tj}-c_{rj} \geq 0$ holds, calculating, by the reader $R_i$, $metaID=h^{c_{tj}-c_{rj}}(metaID_{crj})$, otherwise determining, by the reader $R_i$, that authentication of the tag fails; and
   calculating, by the reader $R_i$, the value of $h(metaID, n_r, n_t)$, and then determining, by the reader $R_i$, whether the calculated value and ME are equal; if they are equal, determining, by the reader $R_i$, that tag authentication by the reader is successful.

2. The method according to claim 1, further comprising the following steps for authenticating the reader $R_i$ by the tag $T_j$:
   calculating, by the reader $R_i$, the value of $M=h(h(metaID), n_r, n_t)$, and then sending, by the reader $R_i$, the value of M to the tag;
   after receiving M, calculating, by the tag $T_j$, $h(h(metaID_{ctj}), n_r, n_t)$, and then determining, by the tag $T_j$, whether the calculated value and M are equal; if they are equal, determining, by the tag $T_j$, that authentication of the reader by the tag is successful, otherwise determining, by the tag $T_j$, that the authentication of the reader fails.

3. The method according to claim 2, further comprising steps for updating:
   after the reader $R_i$ successfully authenticates the tag $T_j$, performing, by the reader $R_i$, an assignment operation: $metaID_{ctj}=metaID$, $c_{rj}=c_{tj}$;
   after the tag $T_j$ successfully authenticates the reader $R_i$, performing, by the tag $T_j$, an operation: $metaID_{ctj}=h(metaID_{ctj})$, $c_{tj}=c_{tj}+1$.

4. The method according to claim 1, wherein after obtaining, by the reader $R_i$, the value of HRI, the finding, by the reader $R_i$, whether there is tag information equal to the value of HRI in the hash table is:
   determining, by the reader $R_i$, the positional value of a corresponding tag in the hash table by finding the remainder from dividing $h(r_i, index_j)$ by a maximum storage space number maxL of the hash table $L_i$, and then finding, by the reader $R_i$, a node with a node value equal to $h(r_i, index_j)$ in a linear linked list corresponding to the positional value, wherein if the node is found, it means that there is tag information equal to the value of HRI, otherwise it means that there is no tag information equal to the value of HRI.

5. A tag searching method, comprising:
   broadcasting, by the reader $R_i$, IN, $r_i$ and $n_r$ to multiple tags, wherein $IN=[h(h(r_i, index_j), n_r)]_m$, $r_i$ is a unique identification of the reader, $n_r$ is a random number generated by the reader, $index_j$ is a unique index of a tag $T_j$ to be found, and $[\ ]_m$ means taking the first m digits of a resulting hash value;
   after the tags receive the broadcast, calculating, by each tag, $[h(h(r_i, ownindex), n_r)]_m$ and comparing, by each tag, the calculated value with the IN; if they are not equal, making no response, otherwise generating, by the tag, a pseudo random number $n_t$, calculating, by the tag, $TM=h(metaID_{ctj}, n_r, n_t)$ and $TC=h(r_i, n_r, n_t) \oplus c_{tj}$, and then feeding, by the tag, TM, TC and $n_t$ back to the reader; and
   obtaining, by the reader $R_i$, $c_{tj}$ via a reverse Exclusive OR operation, calculating, by the reader $R_i$, $metaID=h^{c_{tj}-c_{rj}}(metaID_{crj})$ and $h(metaID, n_r, n_t)$, and then comparing, by the reader $R_i$, the calculated $h(metaID, n_r, n_t)$ with the received TM, wherein if they are equal, it means that the finding the tag $T_j$ by the reader $R_i$ succeeds, otherwise it means that the finding fails.

6. The tag searching method according to claim 5, further comprising:
   performing, by the reader $R_i$, an assignment operation: $metaID_{ctj}=metaID$, $c_{rj}=c_{tj}$ when the finding succeeds; and
   sending, by the reader $R_i$, successfully found information to the tag $T_j$, and after the tag $T_j$ successfully authenticates the reader $R_i$, performing, by the tag $T_j$, an operation:
   $metaID_{ctj}=h(metaID_{ctj})$, $c_{tj}=c_{tj}+1$.

7. A Radio Frequency Identification (RFID) reader, comprising:
   a tag information acquisition module configured to be used for authentication of legitimacy of a reader $R_i$ by an authentication database and request to download information ($metaID_{crj}$, $h(r_i, index_j)$, $c_{rj}$) of a tag $T_j$ from the authentication database;
   a random number generating module configured to generate a random number $n_r$;
   an authentication request module configured to send a request carrying $r_i$ and $n_r$ to the tag $T_j$ and receive a response message carrying values of IN, ME, $c_{tj}$ and $n_t$ sent by the tag;
   a position finding module configured to calculate the value of $h(r_i, n_r, n_t)$, obtain the value of HRI through an Exclusive OR operation on the calculated value of $h(r_i, n_r, n_t)$ and the IN, and then find whether there is tag information equal to the value of HRI and satisfying $c_{tj}-c_{rj} \geq 0$ in a hash table, and if there is not, inform an authentication response module that the authentication fails, otherwise inform a tag identification authentication module that the finding succeeds;
   the tag identification authentication module configured to calculate, when the finding by the position finding module succeeds, the value of $h(metaID, n_r, n_t)$, determine whether the calculated value and ME are equal, and if they are equal, inform the authentication response module that the authentication succeeds, otherwise inform the authentication response module that the authentication fails;
   the authentication response module configured to send authentication failure information to the tag, or send authentication success information carrying the value of M=h(h(metaID), $n_r$, $n_t$); and a storage module configured to store the hash table, the random number and reader identification information, wherein the tag information (metaID$_{crj}$, h($r_i$, index$_j$), $c_{rj}$) issued by the authentication database is stored in the hash table.

8. The RFID reader according to claim 7, further comprising:

an updating module configured to perform an assignment operation metaID$_{ctj}$=metaID, $c_{rj}$=$c_{tj}$ after the reader $R_i$ successfully authenticates the tag $T_j$.

9. A tag, comprising:

a storage module configured to store tag information (metaID$_{ctj}$, index$_j$, $c_{ctj}$) downloaded from an authentication database;

a random number generating module configured to generate a random number $n_t$;

an authentication response module configured to receive a request carrying $r_i$ and $n_r$ sent by a reader $R_i$, calculate HRI=h($r_i$, index$_j$), IN=h($r_i$, $n_r$, $n_t$) $\oplus$ HRI, and ME=h (metaID$_{ctj}$, $n_r$, $n_t$), and then feed a response message carrying values of IN, ME, $c_{tj}$ and $n_t$ back to the reader $R_i$; and a reader authentication module configured to calculate, when receiving a request message carrying an M value sent by the reader $R_i$, h(h(metaID$_{ctj}$), $n_r$, $n_t$), determine whether the calculated h(h(metaID$_{ctj}$), $n_r$, $n_t$) and M are equal, and determine that authentication of the reader by the tag is successful if they are equal, otherwise determine that the authentication of the reader fails.

10. The tag according to claim 9, further comprising:

an updating module configured to perform an operation metaID$_{ctj}$=h(metaID$_{ctj}$), $c_{tj}$=$c_{tj}$+1 after the tag $T_j$ successfully authenticates the reader $R_i$.

* * * * *